United States Patent
Bertrand et al.

(10) Patent No.: US 8,259,598 B2
(45) Date of Patent: Sep. 4, 2012

(54) RANDOM ACCESS STRUCTURE FOR OPTIMAL CELL COVERAGE

(75) Inventors: Pierre Bertrand, Antibes (FR); Anand Dabak, Plano, TX (US); Jing Jiang, Wellesley, MA (US)

(73) Assignee: Texas Instruments Incorporated, Dallas, TX (US)

( * ) Notice: Subject to any disclaimer, the term of this patent is extended or adjusted under 35 U.S.C. 154(b) by 1216 days.

(21) Appl. No.: 11/833,329

(22) Filed: Aug. 3, 2007

(65) Prior Publication Data

US 2008/0192678 A1     Aug. 14, 2008

Related U.S. Application Data

(60) Provisional application No. 60/862,896, filed on Oct. 25, 2006.

(30) Foreign Application Priority Data

Oct. 24, 2006 (EP) .................................. 06291667

(51) Int. Cl.
*G08C 15/00* (2006.01)
(52) U.S. Cl. ............... 370/252; 370/328; 455/422.1
(58) Field of Classification Search ................. None
See application file for complete search history.

(56) References Cited

U.S. PATENT DOCUMENTS

| | | | |
|---|---|---|---|
| 6,438,367 B1 | 8/2002 | Crawford | 455/410 |
| 6,567,383 B1 | 5/2003 | Bohnke | 370/280 |
| 6,665,349 B1 * | 12/2003 | Cherubini et al. | 375/261 |
| 6,741,551 B1 * | 5/2004 | Cherubini | 370/210 |
| 2004/0082356 A1 | 4/2004 | Walton et al. | 455/522 |
| 2005/0135318 A1 | 6/2005 | Walton et al. | 370/338 |
| 2005/0213676 A1 | 9/2005 | Stopler | 375/260 |
| 2005/0286465 A1 * | 12/2005 | Zhuang | 370/329 |
| 2006/0279435 A1 * | 12/2006 | Krishnan et al. | 341/29 |
| 2008/0080461 A1 * | 4/2008 | Lee | 370/342 |
| 2011/0103499 A1 * | 5/2011 | Cheng et al. | 375/260 |

FOREIGN PATENT DOCUMENTS

| | | |
|---|---|---|
| WO | 2006/086093 A1 | 8/2006 |
| WO | 2006/105004 A2 | 10/2006 |

OTHER PUBLICATIONS

Bertrand, Pierre, Texas Instruments, "Improved Non-Synchronized Random Access Structure for E-UTRA," St. Louis, MO., USA, Feb. 12-16, 2007, 3 pgs.

(Continued)

*Primary Examiner* — Chi H. Pham
*Assistant Examiner* — Shick Hom
(74) *Attorney, Agent, or Firm* — Ronald O. Neerings; Wade James Brady, III; Frederick J. Telecky, Jr.

(57) ABSTRACT

Apparatus and method for accessing a wireless telecommunications network by transmitting a random access signal. The random access signal includes a cyclic prefix signal and a guard interval. The cyclic prefix signal and the guard interval are adapted to optimize random access channel coverage in a telecommunications cell. The disclosed method for transmitting a random access signal includes transmitting a cyclic prefix signal. The duration of the cyclic prefix signal is approximately the sum of a maximum round trip delay duration of the telecommunications cell and a maximum delay spread duration. The method further includes providing a guard interval. The guard interval duration being approximately the duration of the maximum round trip delay of the telecommunications cell.

12 Claims, 4 Drawing Sheets

OTHER PUBLICATIONS

Bertrand, Pierre, Texas Instruments, "Improved Non-Synchronized Random Access Structure for E-UTRA," Sorrento, Italy, Jan. 15-19, 2007, 3 pgs.

Bertrand, Pierre, Texas Instruments, "Improved Non-Synchronized Random Access Structure for E-UTRA," Riga, Latvia, Nov. 6-10, 2006, 3 pgs.

* cited by examiner

RANDOM ACCESS STRUCTURE FOR OPTIMAL CELL COVERAGE

CROSS-REFERENCE TO RELATED APPLICATIONS

The present application claims priority to U.S. provisional patent application Ser. No. 60/862,896, filed Oct. 25, 2006, and entitled "Non-Synchronized Random Access Structure Adjustment for E-UTRA," hereby incorporated herein by reference. The present application additionally claims priority to and incorporates by reference European patent application No. 06291667.1, filed on Oct. 24, 2006.

BACKGROUND

As wireless systems proliferate, the expanding user base and the demand for new services lead to the development of new technologies capable of meeting users' ever increasing expectations. Users of mobile telecommunications devices expect not only globally available reliable voice communications, but a variety of data services, such as email, text messaging, and internet access.

In order to meet users' coverage expectations, service providers continue to expand the geographic reach of their wireless networks. However, low subscriber utilization of network resources outside of urban areas tends to increase overall network operating costs. Consequently, wireless systems should be designed to optimize geographic coverage in order to control system costs.

Wireless networks employ a random access channel to facilitate unscheduled transmissions between a mobile terminal, also called user equipment ("UE"), and a fixed access point, also known as a base station ("Node B"). Resource requests and inter-cell handover are examples of two of the many functions employing random access transmissions. In order to meet user and operator expectations, the random access channel employed in future systems will encompass a wider range of functionalities than in previous or current cellular networks. Additionally, to meet network operators' economic goals, the random access channel should be optimized to maximize geographic coverage at minimal cost.

SUMMARY

Accordingly, various techniques are herein disclosed for extending the coverage of a random access channel in a telecommunications cell. In accordance with at least some embodiments, a method includes transmitting a cyclic prefix signal and providing a guard interval. The cyclic prefix signal duration is approximately the sum of a maximum round trip delay duration of the telecommunications cell and a maximum delay spread duration. The guard interval duration is approximately the duration of the maximum round trip delay of the telecommunications cell.

In other embodiments, an apparatus includes a cyclic prefix signal generator and a guard interval generator. The cyclic prefix signal generator generates a cyclic prefix signal having duration of approximately the sum of a maximum delay spread duration and a maximum round trip delay duration of a telecommunications cell. The guard interval generator generates a guard interval having duration of approximately the duration of the maximum round trip delay of the telecommunications cell.

In yet other embodiments, apparatus includes means for generating a cyclic prefix signal and means for generating a guard interval. The cyclic prefix signal generating means generates a cyclic prefix signal having duration of approximately the sum of a maximum delay spread duration and a maximum round trip delay duration of a telecommunications cell. The guard interval generating means generates a guard interval having duration of approximately the duration of the maximum round trip delay of the telecommunications cell.

In still other embodiments, apparatus includes a cyclic prefix signal remover and a random access signal detector. The cyclic prefix signal remover removes a cyclic prefix signal having duration of approximately the sum of a maximum delay spread duration and a maximum round trip delay duration of a telecommunications cell from a random access signal. The random access preamble signal detector detects a random access preamble signal.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" and "e.g." are used in an open-ended fashion, and thus should be interpreted to mean "including, but not limited to . . . ". The term "couple" or "couples" is intended to mean either an indirect or direct connection. Thus, if a first component couples to a second component, that connection may be through a direct connection, or through an indirect connection via other components and connections. The term "system" refers to a collection of two or more hardware and/or software components, and may be used to refer to an electronic device or devices, or a subsystem thereof.

BRIEF DESCRIPTION OF THE DRAWINGS

In the following detailed description, reference will be made to the accompanying drawings, in which.

The drawings show illustrative embodiments that will be described in detail. However, the description and accompanying drawings are not intended to limit the claimed present disclosure to the illustrative embodiments, but to the contrary, the intention is to disclose and protect all modifications, equivalents, and alternatives falling within the spirit and scope of the appended claims.

DETAILED DESCRIPTION

Disclosed herein are various systems and methods for employing a random access channel in a wireless network. Embodiments of the disclosed invention may be used to access a wireless network, such as a telecommunications system, employing random access techniques. A variety of wireless networks employ random access techniques, for example the Enhanced Universal Terrestrial Radio Access Network (E-UTRAN), currently being standardized by the 3GPP working groups. The disclosed embodiments of the invention are applicable to all such networks. The disclosed embodiments include apparatus for transmitting random access signals and a method for transmitting a random access signal optimized for cellular coverage.

Embodiments of the present disclosure are directed, in general, to wireless communication systems, and can be applied to generate random access transmissions. Random access transmissions may also be referred to as ranging transmissions, or other analogous terms.

User Equipment ("UE") may be either up-link ("UL") synchronized or UL non-synchronized. That is, UE transmit timing may or may not be adjusted to align UE transmissions with Node B transmission time slots. When the UE UL has not been time synchronized, or has lost time synchronization, the UE can perform a non-synchronized random access to request allocation of up-link resources. Additionally, a UE can perform non-synchronized random access to register itself at the access point, or for numerous other reasons. Possible uses of random access transmission are many, and do not restrict the scope of the present disclosure. For example, the non-synchronized random access allows the Node B to estimate, and if necessary, to adjust the UE's transmission timing, as well as to allocate resources for the UE's subsequent up-link transmission. Resource requests from UL non-synchronized UEs may occur for a variety of reasons, for example: new network access, data ready to transmit, or handover procedures.

Figure 1:
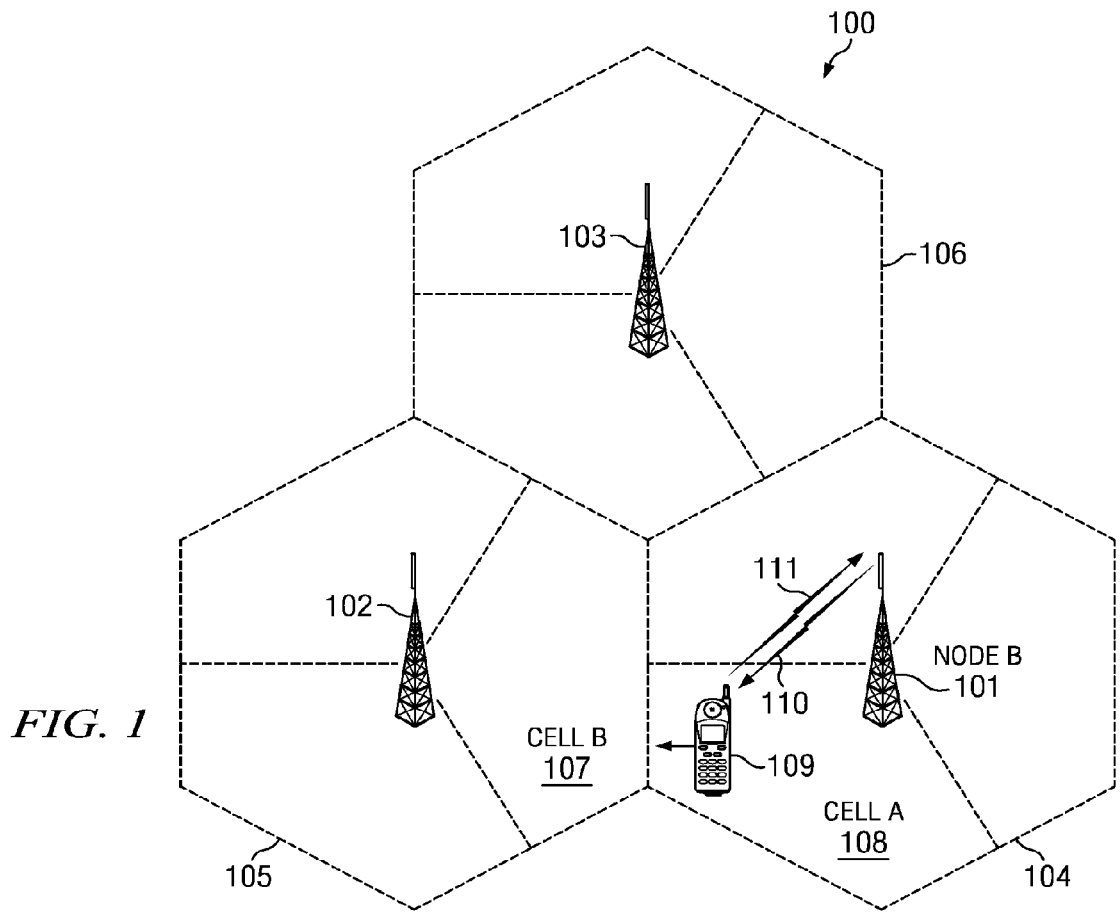
FIG. 1 shows an illustrative telecommunications network in accordance with the preferred embodiments of the invention.

FIG. 1 shows an illustrative wireless telecommunications network 100. The illustrative telecommunications network includes base stations 101, 102, and 103, though in operation, a telecommunications network may includes more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109. As UE 109 moves out of Cell A 108, and into Cell B 107, UE 109 may be "handed over" to base station 102. Assuming that UE 109 is synchronized with base station 101, UE 109 preferably employs non-synchronized random access to initiate handover to base station 102. The distance over which a random access signal is recognizable by base station 101 is a factor in determining cell size.

When UE 109 is not synchronized with base station 101, non-synchronized UE 109 employs non-synchronous random access to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval.

Figure 2:
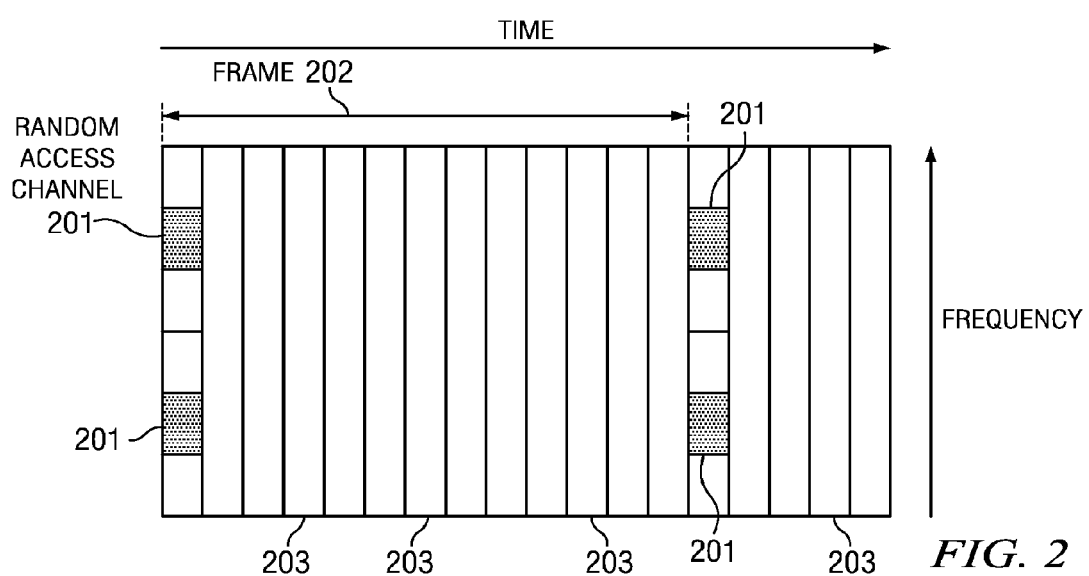
FIG. 2 shows an illustrative up-link time/frequency allocation in accordance with the preferred embodiments of the invention.

FIG. 2 illustrates an exemplary up-link transmission frame 202, and the allocation of the frame to scheduled and random access channels. The illustrative up-link transmission frame 202, comprises a plurality of transmission sub-frames. Sub-frames 203 are reserved for scheduled UE up-link transmissions. Preferably interspersed among scheduled sub-frames 203, are time and frequency resources allocated to random access channels 201. In the illustration of FIG. 2, a single sub-frame supports two random access channels. Note that the illustrated number and spacing of random access channels is purely a matter of convenience; a particular transmission frame implementation may allocate more or less resource to random access channels. Including multiple random access channels allows more UEs to simultaneously transmit a random access signal without collision. However, because each UE independently chooses the random access channel on which it transmits, collisions between UE random access signals may occur.

Figure 3:
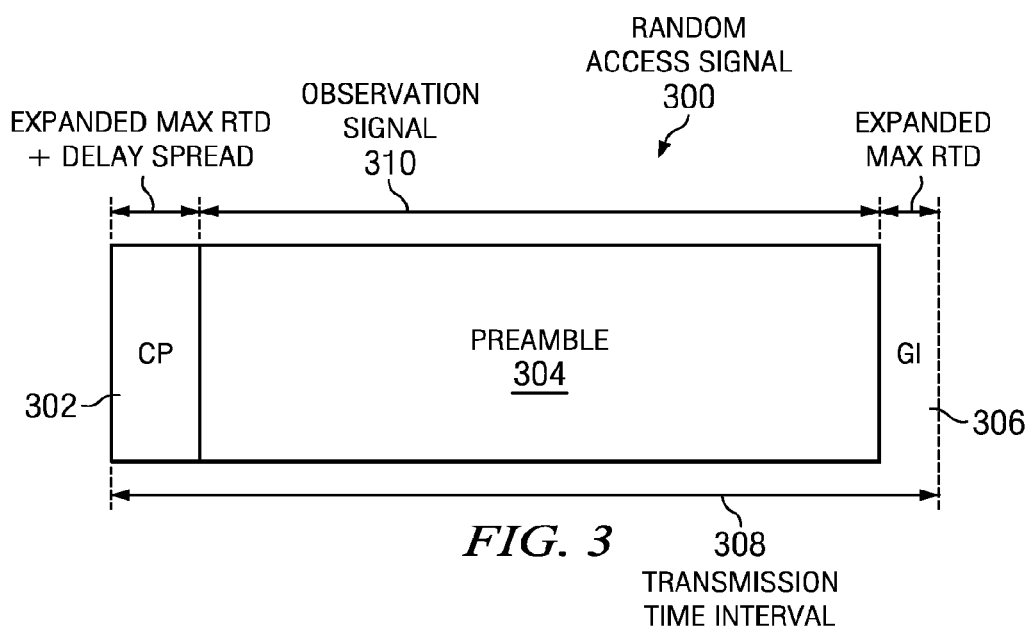
FIG. 3 shows a transmission time interval random access signal in accordance with the preferred embodiments of the invention.

FIG. 3 illustrates a preferred embodiment of a random access signal 300. The illustrated embodiment comprises cyclic prefix 302, random access preamble 304, and guard interval 306. Random access signal 300 is one transmission time interval 308 in duration. Transmission time interval 308 may comprise one or more sub-frame 203 durations. Note that the time allowed for random access signal transmission may vary, and this variable transmission time may be referred to as transmitting over a varying number of transmission time intervals, or as transmitting during a transmission time interval that varies in duration. This disclosure applies the term "transmission time interval" to refer to the time allocated for random access signal transmission of any selected duration, and it is understood that this use of the term is equivalent to uses referring to transmission over multiple transmission time intervals. The time period allotted for random access signal transmission may also be referred to as a random access time slot.

Cyclic prefix 302 and guard interval 306 are of unequal duration. Guard interval 306 has duration equal to approximately the maximum round trip delay of the cell while cyclic prefix 302 has duration equal to approximately the sum of the maximum round trip delay of the cell and the maximum delay spread. As indicated, cyclic prefix and guard interval durations may vary from the ideal values of maximum round trip delay and maximum delay spread while effectively optimizing the random access signal to maximize coverage. All such equivalents are intended to be within the scope of the present disclosure.

Round trip delay is a function of cell size, where cell size is defined as the maximum distance d at which a UE can interact with the cell's base station. Round trip delay can be approximated using the formula t=d*20/3 where t and d are expressed in microseconds and kilometers respectively. The round-trip delay is the two-way radio propagation delay in free space, which can be approximated by the delay of the earlier radio path. A typical earlier path is the line-of-sight path, defined as the direct (straight-line) radio path between the UE and the base station. When the UE is surrounded by reflectors, its radiated emission is reflected by these obstacles, creating multiple, longer traveling radio paths. Consequently, multiple time-delayed copies of the UE transmission arrive at the base station. The time period over which these copies are delayed is referred to as "delay spread," and for example, in some cases, 5 µs may be considered a conservative value thereof.

Cyclic prefix 302 serves to absorb multi-path signal energy resulting from reflections of a signal transmitted in the prior sub-frame, and to simplify and optimize equalization at the Node B 101 receiver by reducing the effect of the channel transfer function from a linear convolution to a cyclic convolution operated across the observation interval 310. Guard interval 306 follows random access preamble 304 to prevent interference between random access preamble signal 304 and any transmission in the subsequent sub-frame on the same transmission frequencies used by random access preamble signal 304.

Random access preamble signal 304 is designed to maximize the probability of preamble detection by the Node B and to minimize the probability of false preamble detections by the Node B, while maximizing the total number of resource opportunities. Embodiments of the present disclosure utilize constant amplitude zero autocorrelation ("CAZAC") sequences to generate the random access preamble signal. CAZAC sequences are complex-valued sequences with the following two properties: 1) constant amplitude (CA), and 2) zero cyclic autocorrelation (ZAC). Well-known examples of CAZAC sequences include (but are not limited to): Chu Sequences, Frank-Zadoff Sequences, Zadoff-Chu (ZC) Sequences, and Generalized Chirp-Like (GCL) Sequences.

As is well known in the art, Zadoff-Chu ("ZC") sequences, as defined by:

$$a_M(k) = \exp[j2\pi(M/N)[k(k+1)/2 + qk]] \text{ for } N \text{ odd}$$

$$a_M(k) = \exp[j2\pi(M/N)[k^2/2 + qk]] \text{ for } N \text{ even}$$

are representative examples of CAZAC sequences. In the above formula, "M" and "N" are relatively prime, and "q" is any fixed integer. Also, "N" is the length of the sequence, "k" is the index of the sequence element, and "M" is the index of the root ZC sequence. Making "N" a prime number maximizes the set of non-orthogonal root ZC sequences having optimal cross-correlation. Thus, when "N" is prime, there are "(N−1)" possible choices for "M," where each choice results in a distinct root ZC CAZAC sequence. In this disclosure, the terms: Zadoff-Chu, ZC, and ZC CAZAC, are used interchangeably. The term CAZAC denotes any CAZAC sequence, ZC or otherwise.

In the preferred embodiments of the present disclosure, random access preamble signal 304 comprises a CAZAC sequence, such as a ZC sequence. Additional modifications to the selected CAZAC sequence can be performed using any of the following operations: multiplication by a complex constant, DFT, IDFT, FFT, IFFT, cyclic shifting, zero-padding, sequence block-repetition, sequence truncation, sequence cyclic-extension, and others. Thus, in the preferred embodiments of the present disclosure, a UE constructs random access preamble signal 304 by selecting a CAZAC sequence, possibly applying a combination of the described modifications to the selected CAZAC sequence, modulating the modified sequence, and transmitting the resulting random access signal over the air.

Assuming that a preamble duration allowing reliable detection at the cell perimeter has been selected, random access channel coverage is maximized by allocating as much of the transmission time interval as possible to round trip delay. In the preferred embodiments of the invention, the maximum round trip delay is taken to be one half of what is left of the transmission time interval 308 after subtracting the preamble duration 304 and the maximum delay spread.

Maximum Round Trip Delay=(TTI−Preamble Duration−Delay Spread)/2

Guard interval 306 is approximately a maximum round trip delay in duration to allow for mistiming of the random access transmission while, in the worst-case of a cell-edge UE, the tail (or delay spread) of the preamble is absorbed by the cyclic prefix of the subsequent TTI. The cyclic prefix 302 is set to a duration of approximately the sum of the maximum round trip delay and the maximum delay spread. This dimensioning of the cyclic prefix 302 and the guard interval 306 serves to maximize the cell radius over which the random access channel is effective while maintaining isolation from adjacent TTIs.

An alternative embodiment of a random access signal may assign a duration of maximum round trip delay plus maximum spread delay to both the cyclic prefix and the guard interval. This dimensioning needlessly allocates a delay spread duration to the guard interval that could otherwise be used to increase round trip delay and thereby increase cell radius.

Figure 4A:
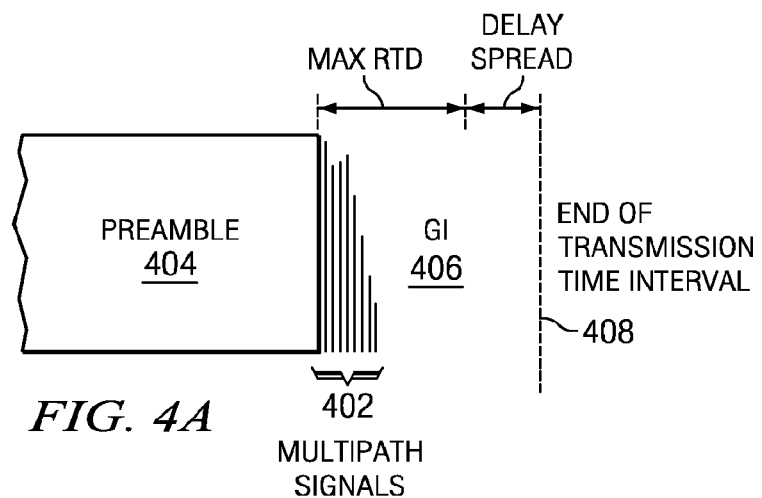
FIGS. 4A and 4B show multi-path resulting from transmission of a random access signal not configured to optimize cell radius.
Figure 4B:
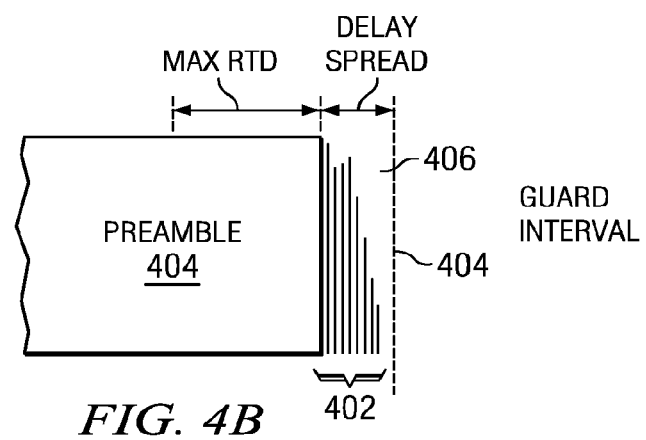

FIG. 4A illustrates the multi-path signals 402 resulting from transmission of a random access signal comprising a guard interval of maximum delay spread plus round trip delay duration when the transmitting UE 109 is located relatively near the receiving Node B 101. As illustrated, the multi-path signals 402 following random access preamble 404 occur during guard interval 406, i.e. before the end of the transmission time interval 408, and consequently do not interfere with signal transmission in the subsequent sub-frame. FIG. 4B illustrates the multi-path signals 402 resulting from transmission of a random access signal comprising a guard interval of maximum delay spread plus round trip delay duration when the transmitting UE 109 is located near the perimeter of cell 109. As illustrated, random access preamble 404 overlaps a portion of guard interval 406, however the multi-path signals 402 are still contained within the guard interval 406 to prevent interference with any transmission in the subsequent sub-frame.

Figure 5A:
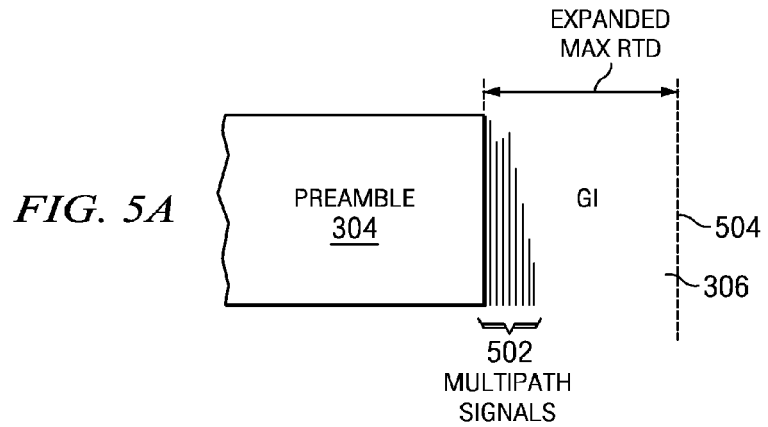
FIGS. 5A and 5B show multi-path resulting from transmission of the random access signal of the preferred embodiment of FIG. 2.

FIG. 5A illustrates the multi-path signals 502 resulting from transmission of the preferred embodiment of a random access signal 300 when the transmitting UE 109 is located relatively near the receiving Node B 101. As illustrated, the multi-path signals 502 following random access preamble 304 are received during guard interval 306, i.e. before the end of the transmission time interval 404, and consequently do not interfere with signal transmission in the subsequent sub-frame.

Figure 5B:
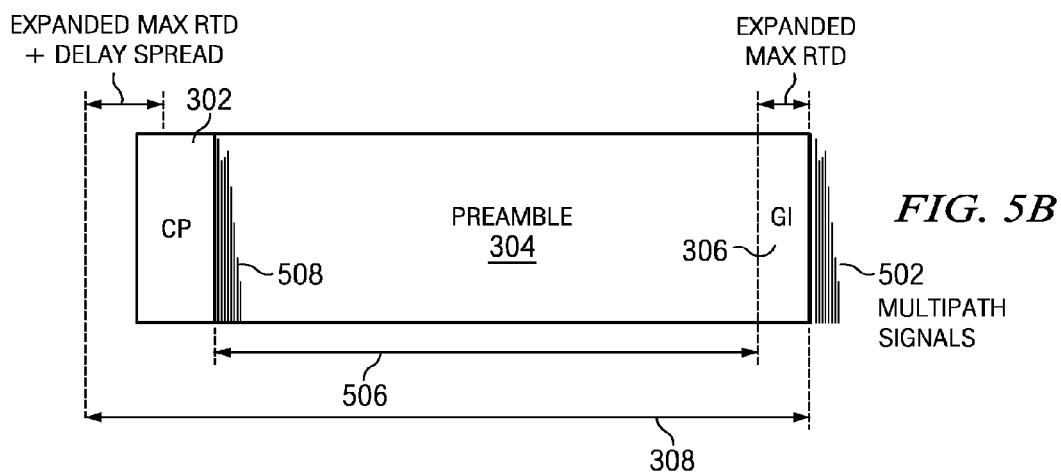

FIG. 5B illustrates a UE 109 random access signal 300 transmission when the UE 109 is located near the perimeter of cell 109. As illustrated, random access preamble 304 may overlap the guard interval 306. However, even when random access preamble 304 completely overlaps guard interval 306, any resultant multi-path signals 502 are absorbed in the cyclic prefix of the subsequent sub-frame and do not interfere with symbol reception in the subsequent sub-frame.

The cyclic prefix 302 is created by replicating the tail of the random access preamble signal 304, thus allowing the cyclic convolution at the Node B receiver. Therefore, the multi-path signals 508 resulting from the cyclic prefix 302 will reproduce the multi-path signals 502 resulting from the random access preamble signal 304. These multi-path signals contain signal energy that is useful for detecting the random access preamble 304. Because the multi-path signals 508 fall within the observation interval 506, the random access preamble signal detection period, no signal energy is lost when the guard interval 306 does not include the delay spread duration. Thus, the preferred embodiment of a random access signal 300 is no less detectable than random access signal embodiments that include delay spread in the guard interval.

Assuming a transmission time interval of one millisecond, a random access signal comprising both cyclic prefix and guard interval of maximum delay spread plus round trip delay duration may yield a cell radius of 14.25 kilometers as disclosed in Table 1 below.

TABLE 1

Achievable cell radius of the described un-optimized random access signal embodiment with a 1 ms Random Access Slot

| | Field Duration (us) | | | | |
|---|---|---|---|---|---|
| | Preamble | | | Preamble | Max cell |
| CP | Sequence Length | Duration (us) | GI | sampling rate (MHz) | radius from GI (km) |
| 100 | 863 | 800 | 100 | 1.07875 | 14.25 |

The preferred embodiment of a random access signal as illustrated in FIG. 3, when assuming a transmission time interval of one millisecond, may yield a cell radius of 14.61 kilometers as disclosed in Table 2 below.

TABLE 2

Achievable cell radius of the preferred random access signal embodiment of FIG. 3 with a 1 ms Random Access Slot

| | Field Duration (us) | | | Preamble | Max cell | Max delay |
|---|---|---|---|---|---|---|
| | Preamble | | | sampling | radius | spread |
| CP | Sequence Length | Duration (us) | GI | rate (MHz) | from GI (km) | from CP (us) |
| 102.60 | 863 | 800 | 97.40 | 1.07875 | 14.61 | 5.21 |

Thus, the preferred embodiment of a random access signal 300 serves to optimize the cell radius over which the random access channel is effective without increasing the transmission time interval or the preamble duration, while providing multi-path interference protection.

Figure 6:
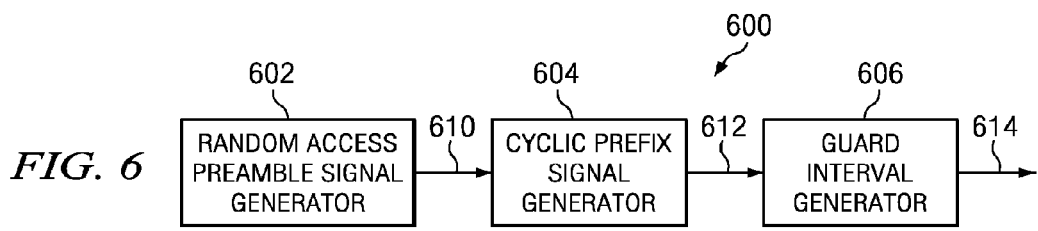
FIG. 6 shows a random access signal transmitter in accord with the preferred embodiments of the invention.

FIG. 6 show an illustrative random access signal generator 600 in accordance with the preferred embodiments. Random access signal generator 600 is adapted for use in a UE accessing the random access channel of a wireless network. Random access preamble signal generator 602 produces a random access preamble signal 610. The random access preamble signal 610 preferably comprises a CAZAC sequence. The random access preamble signal 610 more preferably comprises a prime length ZC CAZAC sequence. In some embodiments, the preamble signal CAZAC sequence is autonomously selected by the preamble generator 602 from a set of CAZAC sequences.

In some preferred embodiments, a set of CAZAC sequences is generated by applying one or more modifications to a root CAZAC sequence. The modification applied to the root CAZAC sequence is preferably a cyclic shift dimensioned in accordance with the physical limitations of the cell, which include the cell's maximum round trip delay plus the delay spread of the channel. For example, a single root ZC CAZAC sequence may be cyclically shifted by any integer multiple of the cell's maximum round trip delay plus the delay spread, to generate a set of pre-defined random access preamble signals. The maximum round trip delay plus the delay spread of the channel calls for conversion to the sampling unit of the sequence. Thus, if the maximum round trip plus the delay spread of the channel is given as "x," then possible choices for cyclic shift values can be dimensioned as n from {0, x, 2x, . . . , (u−1)x} where ux can't exceed the length of the sequence which is being cyclically shifted.

Preamble generator 602 may generate random access preamble signal 610 such that random access preamble signal 610 has maximum duration of approximately the transmission time interval less twice the cell's maximum round trip delay less the channel's delay spread. The random access signal 614 comprises the cyclic prefix and appended random access preamble signal 610 followed by a guard interval.

Cyclic prefix generator 604 is coupled to preamble generator 602. Cyclic prefix generator 604 inserts a cyclic prefix signal ahead of the random access preamble signal 610. The cyclic prefix signal may be a repetition of the signal at the end of the random access preamble signal 610. The duration of the prefix signal constructed by cyclic prefix generator 604 is approximately the sum of the cell's maximum round trip delay and the channel's delay spread.

Following transmission of the cyclic prefix and the appended random access preamble 612, guard interval generator 606 inserts a guard interval at the end of the transmission time interval to complete random access preamble signal 614. The guard interval duration is approximately equal to the maximum round trip delay duration of the cell.

Random access signal generator 600 and all of its components may be implemented with a digital signal processor, either fixed or programmable, or other programmed processor, or may be implemented with dedicated circuitry, discrete or integrated, or any combination of the aforementioned or their equivalents.

Figure 7:
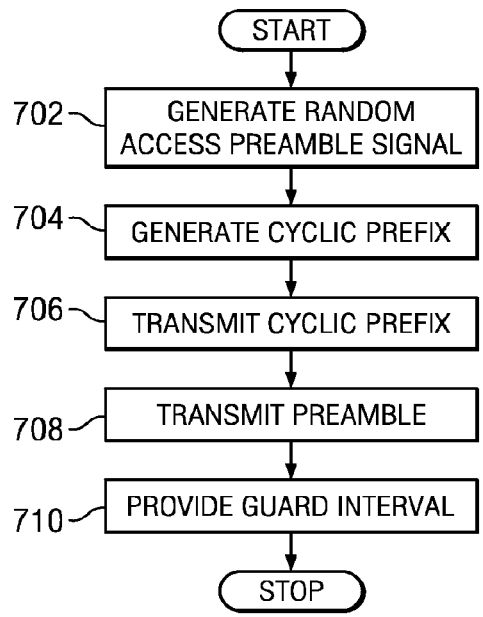
FIG. 7 shows a flow diagram of a method for generating a random access signal in accord with the preferred embodiments of the invention.

FIG. 7 shows a flow diagram of an illustrative method for random access signal transmission in accordance with the present disclosure. In block 702, a random access preamble signal is generated. The random access preamble signal has maximum duration of approximately the random access slot duration less twice the cell's maximum round trip delay less the channel's delay spread. Moreover, the random access preamble signal preferably comprises a prime length ZC-CAZAC sequence autonomously selected from a plurality of prime length ZC-CAZAC sequences.

A cyclic prefix is generated in block 704 and affixed to the start of the random access preamble signal. The cyclic prefix is a repetition of the signal values at the end of the random access preamble signal. The cyclic prefix has a maximum duration of approximately the sum of the duration of the cell's maximum round trip delay and the maximum spread delay duration.

In block 706 the cyclic prefix is transmitted over the air, followed by transmission of the random access preamble signal in block 708.

A guard interval is inserted into the random access signal in block 710. The duration of the guard interval is approximately the duration of the maximum round trip delay of the cell.

Figure 8:
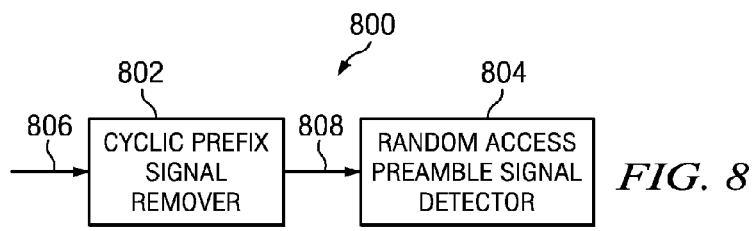
FIG. 8 shows a random access signal receiver in accord with at least some preferred embodiments of the invention.

FIG. 8 shows a random access signal receiver 800 in accord with at least some preferred embodiments of the invention. The receiver advantageously makes use of a cyclic prefix and guard interval dimensioned to maximize round trip delay. The received random access signal 806 comprises a cyclic prefix signal 302 and a random access preamble signal 304. The cyclic prefix has a maximum duration of approximately the sum of the duration of the cell's maximum round trip delay and the maximum spread delay duration. The random access preamble signal has maximum duration of approximately the random access slot duration less twice the cell's maximum round trip delay less the channel's delay spread.

A cyclic prefix signal remover 802 strips the optimized duration cyclic prefix from the random access preamble signal 806. A random access signal detector 804 is coupled to the cyclic prefix remover 802. The output of the cyclic prefix remover 802, the received random access signal less the cyclic prefix 808, is fed into random access preamble signal detector 804. Random access signal detector 804 operates to detect the random access preamble signal by, for example, transforming signal 808 into the frequency domain, demapping the preamble sub-carriers and correlating against possible random access preamble root sequences.

Figure 9:
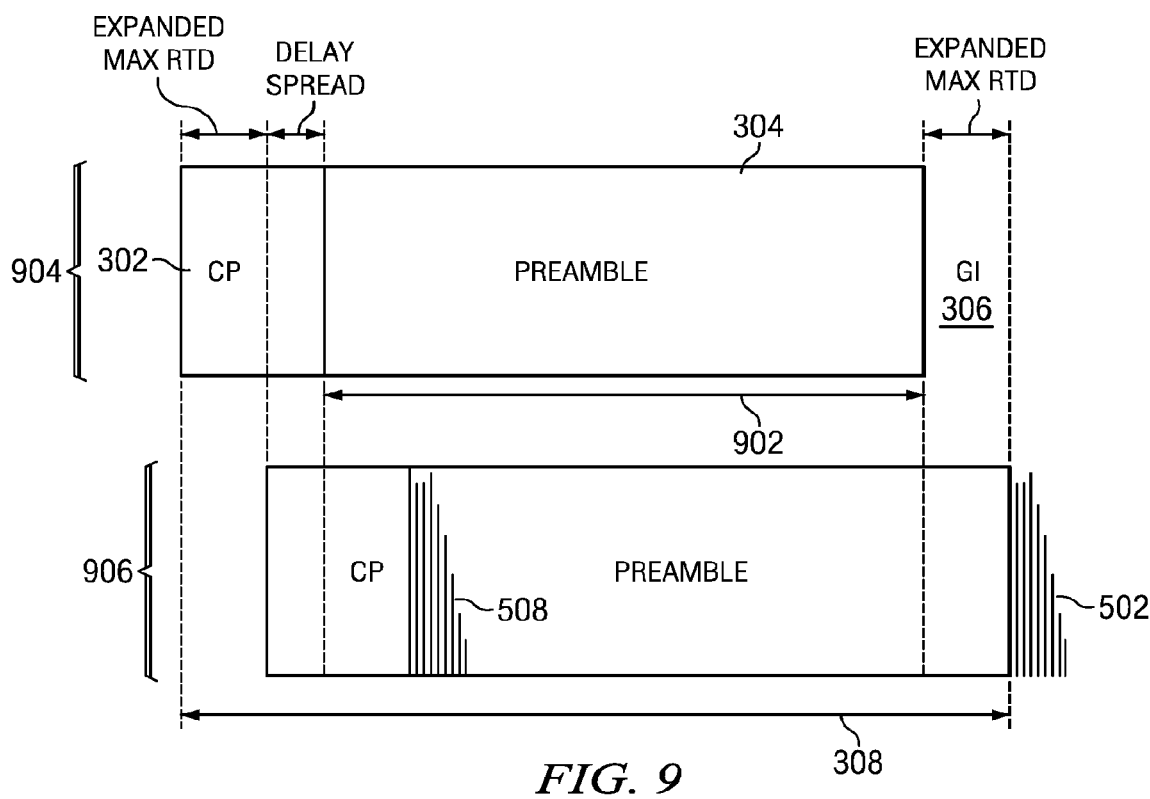
FIG. 9 illustrates the observation interval over which a random access signal receiver detects a random access preamble signal in accord with the preferred embodiments of the invention.

As illustrated in FIG. 9, the random access signal receiver 800 detects random access preamble signals occurring during the observation interval 902. The observation interval 902 begins at a point in time approximately one maximum round trip delay and one delay spread from the start of the random access time slot 308 and extends to within approximately one maximum round trip delay from the end of the random access time slot. Random access signal 904 represents a transmission from a UE near the base station, and random access signal 906 represents a transmission from a UE near the cell perimeter. As illustrated, multi-path components 508, replicas of multi-path components 502 occurring at the end of the preamble, fall within the observation interval 902 of random access receiver 800. Thus, receiver 800 captures the signal energy of the random access preamble and the resultant multi-path signals.

While illustrative embodiments of this present disclosure have been shown and described, modifications thereof can be made by one skilled in the art without departing from the spirit or teaching of this present disclosure. The embodiments described herein are illustrative and are not limiting. Many variations and modifications of the system and apparatus are possible and are within the scope of the present disclosure. Accordingly, the scope of protection is not limited to the embodiments described herein, but is only limited by the claims which follow, the scope of which shall include all equivalents of the subject matter of the claims.

What is claimed is:

1. A method for transmitting a random access signal, comprising:
   transmitting a cyclic prefix signal, wherein the duration of the cyclic prefix signal is approximately the sum of a maximum round trip delay duration of a telecommunications cell and a maximum delay spread duration;
   providing a suffix guard interval, wherein the guard interval duration is approximately the duration of the maximum round trip delay of the telecommunications cell; and
   transmitting a random access preamble signal appended to the cyclic prefix.

2. A method for transmitting a random access signal, comprising:
   transmitting a cyclic prefix signal, wherein the duration of the cyclic prefix signal is approximately the sum of a maximum round trip delay duration of a telecommunications cell and a maximum delay spread duration;
   providing a suffix guard interval, wherein the guard interval duration is approximately the duration of the maximum round trip delay of the telecommunications cell; and
   transmitting a random access preamble signal appended to the cyclic prefix, the random access preamble signal comprising a signal selected from the group consisting of a Constant Amplitude Zero Autocorrelation (CAZAC) sequence and a Zadoff-Chu CAZAC sequence.

3. An apparatus comprising:
   a cyclic prefix signal generator that generates a cyclic prefix signal, wherein the cyclic prefix signal generator generates a cyclic prefix signal having duration of approximately the sum of a maximum delay spread duration and a maximum round trip delay duration of a telecommunications cell;
   a guard interval generator, coupled to the cyclic prefix signal generator, that provides a suffix guard interval, wherein the duration of the guard interval is approximately the duration of the maximum round trip delay of the telecommunications cell; and
   a random access preamble signal generator, coupled to the cyclic prefix signal generator, wherein the random access preamble signal generator generates a random access preamble signal appended to the cyclic prefix.

4. An apparatus comprising:
   a cyclic prefix signal generator that generates a cyclic prefix signal, wherein the cyclic prefix signal generator generates a cyclic prefix signal having duration of approximately the sum of a maximum delay spread duration and a maximum round trip delay duration of a telecommunications cell;
   a guard interval generator, coupled to the cyclic prefix signal generator, that provides a suffix guard interval, wherein the duration of the guard interval is approximately the duration of the maximum round trip delay of the telecommunications cell; and
   a random access preamble signal generator, coupled to the cyclic prefix signal generator, wherein the random access preamble signal generator generates a random access preamble signal appended to the cyclic prefix, wherein the random access preamble signal generator generates a random access preamble signal comprising a signal selected from the group consisting of a Constant Amplitude Zero Autocorrelation (CAZAC) sequence and a prime length Zadoff-Chu CAZAC sequence.

5. An apparatus comprising:
   a cyclic prefix signal generator that generates a cyclic prefix signal, wherein the cyclic prefix signal generator generates a cyclic prefix signal having duration of approximately the sum of a maximum delay spread duration and a maximum round trip delay duration of a telecommunications cell;
   a guard interval generator, coupled to the cyclic prefix signal generator, that provides a suffix guard interval, wherein the duration of the guard interval is approximately the duration of the maximum round trip delay of the telecommunications cell; and
   a random access preamble signal generator, coupled to the cyclic prefix signal generator, wherein the random access preamble signal generator generates a random access preamble signal appended to the cyclic prefix, wherein the random access preamble signal generator selects a random access preamble signal from a plurality of random access preamble signals.

6. The apparatus of claim 3, further comprising a wireless telecommunications device that accesses a wireless network.

7. The apparatus of claim 3, further comprising a wireless telecommunications device that accesses a wireless network constructed in accord with the Enhanced Universal Terrestrial Radio Access Network standard by transmission of a random access signal comprising the cyclic prefix and the guard interval.

8. An apparatus, comprising:
means for generating a cyclic prefix signal, wherein the cyclic prefix generating means generates a cyclic prefix signal having duration of approximately the sum of a maximum delay spread duration and a maximum round trip delay duration of a telecommunications cell; and
means for providing a guard interval, wherein the guard interval generating means provides a suffix guard interval having duration of approximately the duration of the maximum round trip delay of the telecommunications cell; and
means for generating a random access preamble signal, the random access preamble signal being appended to the cyclic prefix.

9. An apparatus, comprising:
means for generating a cyclic prefix signal, wherein the cyclic prefix generating means generates a cyclic prefix signal having duration of approximately the sum of a maximum delay spread duration and a maximum round trip delay duration of a telecommunications cell; and
means for providing a guard interval, wherein the guard interval generating means provides a suffix guard interval having duration of approximately the duration of the maximum round trip delay of the telecommunications cell; and
means for generating a random access preamble signal, the random access preamble signal being appended to the cyclic prefix, wherein the random access preamble signal generated by the random access preamble signal generating means comprises a signal selected from the group consisting of a Constant Amplitude Zero Autocorrelation (CAZAC) sequence and a prime length Zadoff-Chu CAZAC sequence.

10. An apparatus, comprising:
means for generating a cyclic prefix signal, wherein the cyclic prefix generating means generates a cyclic prefix signal having duration of approximately the sum of a maximum delay spread duration and a maximum round trip delay duration of a telecommunications cell; and
means for providing a guard interval, wherein the guard interval generating means provides a suffix guard interval having duration of approximately the duration of the maximum round trip delay of the telecommunications cell; and
means for generating a random access preamble signal, the random access preamble signal being appended to the cyclic prefix, wherein the random access signal generating means selects a random access preamble signal from a plurality of random access preamble signals.

11. An apparatus comprising:
a cyclic prefix signal remover, wherein the cyclic prefix signal remover removes a cyclic prefix signal having duration of approximately the sum of a maximum delay spread duration and a maximum round trip delay duration of a telecommunications cell from a random access signal; and
a random access preamble signal detector, wherein the random access preamble signal detector detects the random access preamble signal within an observation interval beginning approximately a maximum delay spread duration and a maximum round trip delay duration of the telecommunications cell from the start of the random access time slot, and extending to within approximately a maximum round trip delay duration of the telecommunications cell from the end of the random access time slot.

12. An apparatus comprising:
a cyclic prefix signal remover, wherein the cyclic prefix signal remover removes a cyclic prefix signal having duration of approximately the sum of a maximum delay spread duration and a maximum round trip delay duration of a telecommunications cell from a random access signal; and
a random access preamble signal detector, wherein the random access preamble detector detects the random access preamble signal within an observation interval whose duration is approximately the duration of a random access time slot less twice the duration of the maximum round trip delay less the duration of the maximum delay spread.

* * * * *